United States Patent [19]

McClain

[11] Patent Number: 4,555,130
[45] Date of Patent: Nov. 26, 1985

[54] DIVER'S UMBILICAL QUICK-DISCONNECT DEVICE

[75] Inventor: D. Wayne McClain, Panama City, Fla.

[73] Assignee: The United States of America as represented by the Secretary of the Navy, Washington, D.C.

[21] Appl. No.: 481,174

[22] Filed: Apr. 1, 1983

[51] Int. Cl.[4] .............................................. F16L 35/00
[52] U.S. Cl. ........................................ 285/26; 285/38; 285/90; 285/137 R; 285/305; 285/424; 285/DIG. 15
[58] Field of Search ...................... 285/137 R, 81, 305, 285/90, 26, 38, DIG. 15, 424

[56] References Cited

U.S. PATENT DOCUMENTS

| | | | |
|---|---|---|---|
| 2,305,809 | 12/1942 | Maisch | 285/81 X |
| 2,328,988 | 9/1943 | Martin | 287/119 |
| 2,628,850 | 2/1953 | Summerville | 285/137 R X |
| 3,489,439 | 3/1968 | Word, Jr. | 285/143 |
| 3,811,786 | 5/1974 | Valle | 403/300 |
| 3,842,389 | 10/1974 | Glover et al. | 339/60 M |
| 3,883,209 | 5/1975 | Kongelbeck | 339/125 R |
| 3,898,705 | 8/1975 | Schuler | 9/313 |
| 3,929,356 | 12/1975 | Devincent et al. | 285/305 |
| 4,208,270 | 6/1980 | Grieve | 285/137 R X |

FOREIGN PATENT DOCUMENTS 2129133  1/1972  Fed. Rep. of Germany ... 285/137 R

Primary Examiner—Dave W. Arola
Attorney, Agent, or Firm—Robert F. Beers; Harvey A. David

[57] ABSTRACT

A quick-disconnect device for coupling segments of a diver's umbilical hoses includes separable rectangular bodies carrying complementary hose couplings spaced therealong. The bodies, which have nested rim and reduced portions, are biased toward separation by a rectangular, flat-type spring and releasable retained against separation by a retractable retaining pin extending diagonally therethrough and normally locked against retraction by partial rotation.

8 Claims, 4 Drawing Figures

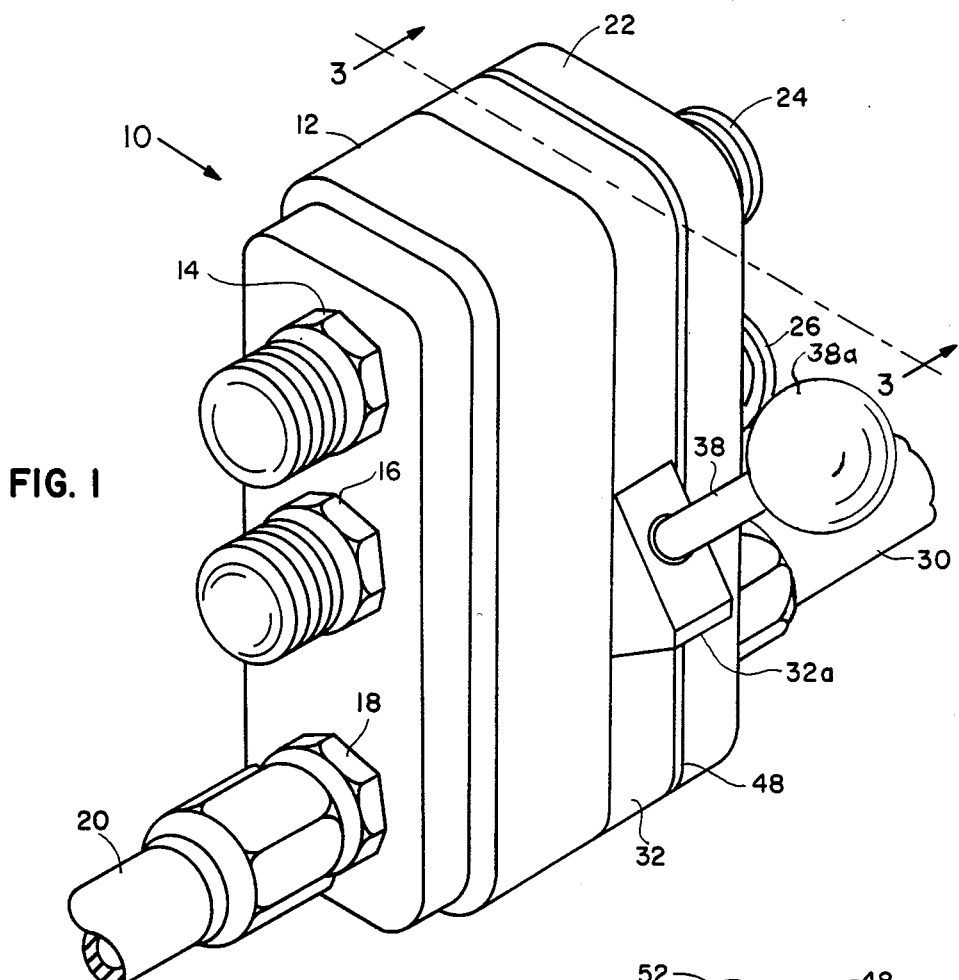
FIG. 1
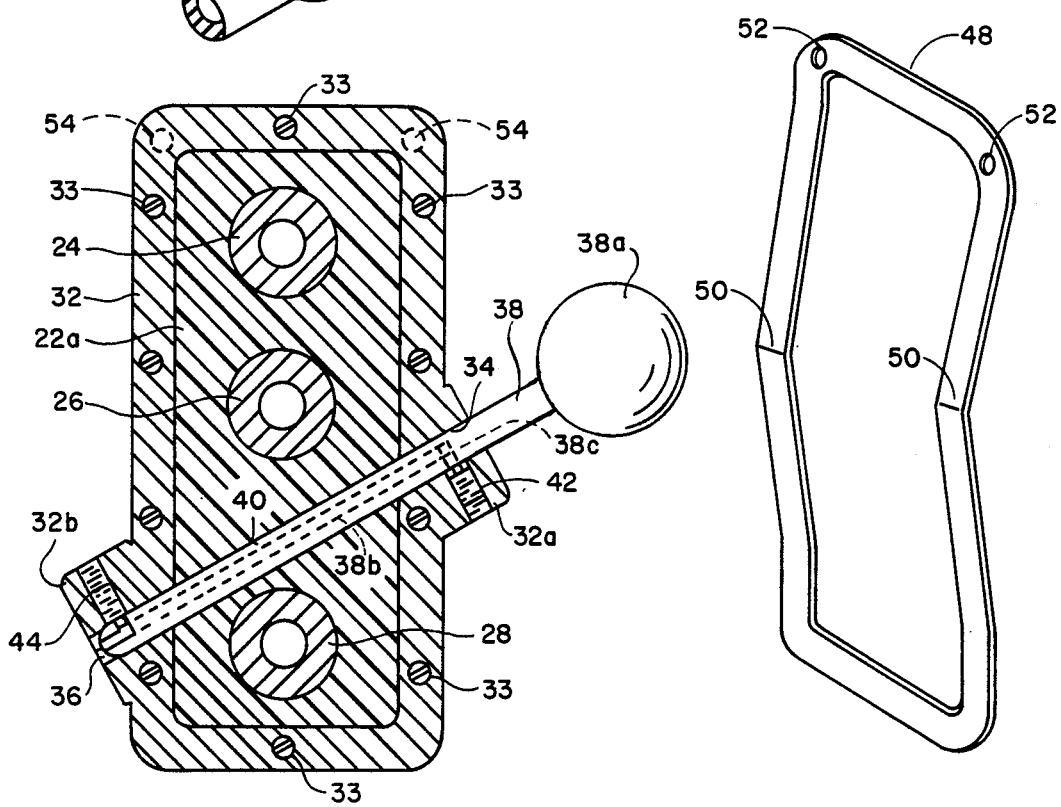
FIG. 3
FIG. 4

DIVER'S UMBILICAL QUICK-DISCONNECT DEVICE

BACKGROUND OF THE INVENTION

This invention relates to the field of diver's life support or umbilical connections, and more particularly to a multiple hose, emergency quick-disconnect device.

Underwater breathing apparatus for divers are often supplied with breathing gas, heating water, or other fluids via hoses from a remote location at the surface or a submerged platform or station such as a diving bell or a personnel transfer capsule. One of the failure modes that must be contemplated is the fouling of such hoses at a point that is at such a distance from the platform or other station that the diver is unable to return thereto, or to some other haven. It has been contemplated that the diver be provided with an emergency, self-contained supply of breathing gas for use in case of interruption of the normal supply by hose. Such get-home capability is necessarily of rather short duration, and accordingly there is needed a reliable quick-disconnect capability by which the diver can rapidly break his connection with normal service supply hoses so as to permit his safe return to the platform, capsule or other haven within the limited time permitted by the get-home capability of the breathing apparatus.

SUMMARY OF THE INVENTION

With the foregoing in mind, it is a principal object of this invention to provide a reliable, easily and quickly operable device for effecting rapid disconnection of the life support service hose or hoses from the diver's suit or breathing apparatus so as to free the diver in the case of emergency, or the like.

Another important object of the invention is to provide a multiple hose coupling, connect/disconnect device that can be actuated to release the connection by a simple manuever such as pulling a keeper pin, which manuever can be readily accomplished with one hand even if heavily gloved.

Yet another object is to provide a hose coupling device of the foregoing character that avoids any likelihood of inadvertent or untimely operation that might effect an unwanted or unexpected disconnection that could place the diver in jeopardy.

As another object, the invention aims to provide a diver hose quick disconnect device that is economical to manufacture, of durable construction, yet light and positive in operation, and which can be conveniently used repeatedly as the connection of the service hoses to the diver during dressing.

Other objects and many of the attendant advantages will be readily appreciated as the subject invention becomes better understood by reference to the following detailed description, when considered in conjunction with the accompanying drawings.

DESCRIPTION OF THE DRAWINGS

FIG. 1 is a perspective view of a diver's umbilical quick-disconnect device embodying the invention;

FIG. 3 is a sectional view taken substantially along line 3—3 of FIG. 1; and

FIG. 4 is a perspective view of a spring member forming part of the device.

DESCRIPTION OF THE PREFERRED EMBODIMENT

Figure 2:
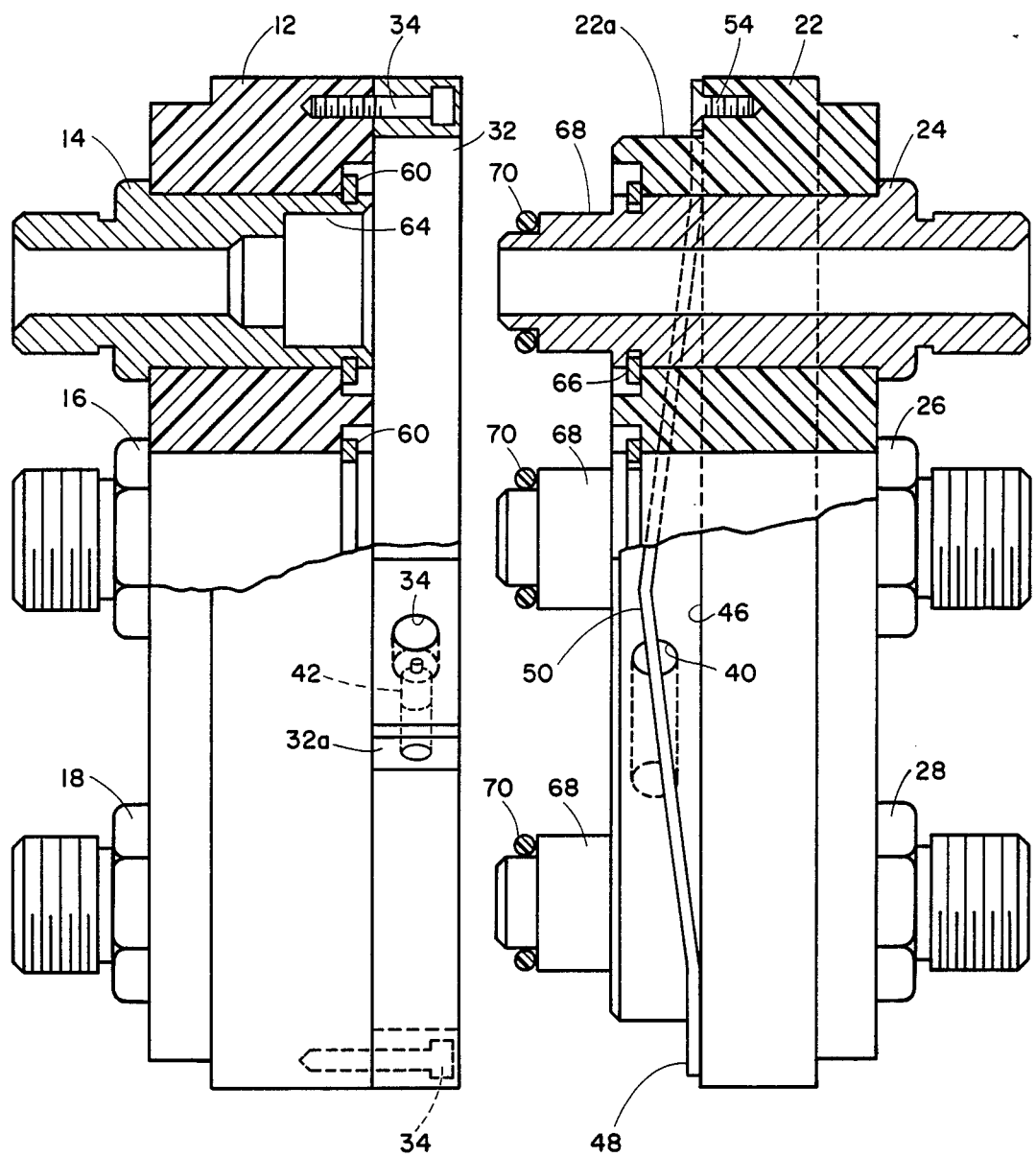
FIG. 2 is a side view of the device of FIG. 1, partly in elevation and partly in section, shown in disconnected condition.

In the exemplary form of the invention illustrated in the drawings and described hereinafter, and with particular reference first to FIG. 1, a quick-disconnect, multiple hose connector device is indicated generally at 10. The device 10 comprises a generally rectangular first body 12 that carries a first plurality of coupling elements or halves 14, 16, and 18 that have exposed, externally threaded nipples for threaded connection to air or water supply hoses, such as hose 20, leading from a supply station. A generally rectangular second body 22 carries a second plurality of coupling elements or halves 24, 26, and 28 (FIG. 2) in mating registration alignment with the coupling halves 14, 16, and 18, respectively, and having exposed, externally threaded nipples for threaded connection with hoses, such as 30, forming a diver's whip or umbilical segment serving the diver's life support apparatus. The bodies 12 and 22 are conveniently formed of a corrosion resistant material, suitable for underwater use, such as a rigid synthetic plastic material.

As is best illustrated in FIG. 2, wherein the coupling halves and the bodies 12 and 22 carrying them have been separated, a rectangular rim member 32 is fixed to the peripheral portion of the inner face of body 12 by screws 33. This rim member serves to guidingly receive a reduced portion 22a of the body 22 when the device is assembled. Referring also to FIG. 3, the rim member 32 has laterally projecting ears 32a, 32b which have aligned, diagonal bores 34, 36 receiving a retaining pin 38. The reduced portion 22a of body 22 has a diagonal bore 40 in registration alignment with the bores 34, 36 and through which the retaining pin 38 also passes.

Pin 38 has a round-shaped handle 38a that can be manually rotated to turn the pin a quarter turn in one direction to lock the pin against withdrawal, or a quarter turn in the opposite direction to permit retraction so as to allow separation of the bodies 12 and 22 and decoupling of the associated coupling halves. To this end, the pin 38 has axially extending grooves 38b, each ending in circumferentially extending groove portions 38c cooperating with nibs projecting from the ends of screws 42,44 threaded into ears 32a, 32b, respectively, at least one of the nibs being operative to limit retraction of the retainer pin completely from the rim.

Disposed about the reduced portion 22a of body 22 and against the shoulder 46 formed thereby is a generally rectangular spring member 48 that is formed from flat spring stock, preferably of stainless steel, to have angular bends 50 in the side portions as illustrated in FIG. 4. The spring member 48 has apertures 52 at the corners of one end and that end is fixed by screws 54 to the body 22. The other end of the spring member is free to move relative to body 22. When the device is assembled, the spring member 48 is resiliently flattened between the shoulder 46 and the rim member 32 so as to provide a force tending to separate the bodies 12 and 22.

The hose coupling halves 14, 16 and 18 are retained in parallel bores in body 12 by keeper rings 60. These coupling halves comprise threaded nipples at their outer ends and stepped axial bores forming receptacles 64 at their inner ends. It will be noted that the spacing between coupling halves 16 and 18 is greater than between 14 and 16. This avoids possibility of incorrect orientation of the halves during a coupling operation and also provids sufficient space for the angular disposition of the retainer pin 38. That disposition provides a better distribution of retaining forces and also provides for a more natural direction of pull for a diver when the device 10 is worn with his life support system.

The hose coupling halves 24, 26, and 28, which are spaced in a corresponding manner to coupling halves 14, 16, and 18, are retained in parallel bores in body 22 by keeper rings 66 and comprise threaded nipples at their outer ends. The inner ends are provided with stepped projections 68 adapted to be received in the receptacles 64. O-rings 70 serve to effect seals between the corresponding coupling halves when engaged.

In operation, the device 10 serves to couple a diver's whip or umbilical segment to service hoses in a reliable manner free of liklihood of unintentional decoupling. Yet the diver is readily able to quickly effect disconnection by simply rotating the retainer pin 38 a quarter turn and pulling on it. The spring member 48 flexes to its rest condition causing separation of the bodies 12 and 22 and the associated coupling halves to be initiated.

Obviously, other embodiments and modifications of the subject invention will readily come to the mind of one skilled in the art having the benefit of the teachings present in the foregoing description and the drawing. It is, therefore, to be understood that this invention is not to be limited thereto and that said modifications and embodiments are intended to be included within the scope of the appended claims.

What is claimed is:

1. A diver's life support umbilical quick-disconnect device for coupling and uncoupling a plurality of first hoses and a like plurality of second hoses, said device comprising:
   a first generally rectangular body;
   a plurality of first hose coupling elements extending through said first body and disposed in spaced, side-by-side parallel relation along the long axis of said first body with their corresponding coupling element engaging ends located on one side of said first body;
   means defining a rim around the peripheral portion of said one side of said first body;
   a second generally rectangular body having a main portion and a reduced portion defining therebetween a peripheral shoulder extending about said second body, said reduced portion being received in said rim;
   a plurality of second hose coupling elements extending through said second body and disposed in spaced, side-by-side parallel relation along the long axis of said second body with their corresponding coupling element engaging ends engaged with the coupling element engaging ends of said first hose coupling elements;
   a plurality of sealing means, each operative to provide a seal between corresponding ones of said first and second coupling elements;
   spring means, disposed between and compressed by said shoulder and said rim for urging said bodies away from one another; and
   retainer means, cooperating with said first and second bodies for holding said bodies together against the urging of said spring means, said retainer means being actuable to release said bodies for movement away from one another under the influence of said spring means so as to disengage said coupling elements.

2. A device as defined in claim 1, and wherein:
   said spring means comprises a generally rectangular spring member formed from flat stock and having a central opening receiving said reduced portion of said second body.

3. A device as defined in claim 2, and wherein:
   said rim and said reduced portion have diagonal openings that are aligned transversely of said device;
   said retainer means comprises a retaining pin extending through said aligned diagonal openings;
   said retaining pin being retractable by force along the axis of said pin member so as to release said bodies for separation by said spring member.

4. A device as defined in claim 3, and wherein:
   said first hose coupling elements comprise at least three elements having unequal spacing along said long axis of said first body; and
   said second hose coupling elements comprise at least three elements having corresponding unequal spacing along the long axis of said second body; and
   said retaining pin passes diagonally between at least two of said coupling elements.

5. A device as defined in claim 4, and wherein:
   said means defining said rim comprises first and second ears projecting from opposite sides of said rim at diagonal locations with said diagonal openings of said rim extending therethrough;
   said retaining pin is characterized by a groove having an axially extending portion and a circumferentially extending portion; and
   means associated with at least one of said ears and cooperating with said groove for alternatively locking said pin member against axial movement when said pin is in a first rotative position, and allowing said axial movement when the pin is in a second rotative position.

6. A device as defined in claim 5, and wherein:
   said retaining pin is characterized by a plurality of axial and circumferential grooves; and
   said means for alternately locking against and allowing axial movement of said pin comprises first and second groove engaging elements associated with said first and second ears, respectively, and projecting into said diagonal openings therein for cooperation with said grooves of said pin.

7. A device as defined in claim 6, and wherein:
   at least one of said groove engaging elements is operative to limit retraction of said retaining pin completely from said rim.

8. A device as defined in claim 7, and wherein:
   said retaining pin is characterized by a round-shaped handle for facilitating said rotation and retraction thereof.

* * * * *